US008934331B2

(12) United States Patent
Song et al.

(10) Patent No.: US 8,934,331 B2
(45) Date of Patent: Jan. 13, 2015

(54) CIRCUIT SWITCHED FALLBACK PROCEDURE

(75) Inventors: Osok Song, San Diego, CA (US); Fatih Ulupinar, San Diego, CA (US); Shyamal Ramachandran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 734 days.

(21) Appl. No.: 12/876,347

(22) Filed: Sep. 7, 2010

(65) Prior Publication Data
US 2011/0216645 A1 Sep. 8, 2011

Related U.S. Application Data

(60) Provisional application No. 61/256,479, filed on Oct. 30, 2009, provisional application No. 61/259,013, filed on Nov. 6, 2009.

(51) Int. Cl.
*H04L 1/00* (2006.01)
*H04W 36/00* (2009.01)
*H04W 36/08* (2009.01)

(52) U.S. Cl.
CPC .......... *H04W 36/0022* (2013.01); *H04W 36/08* (2013.01)
USPC ........................................................ 370/216

(58) Field of Classification Search
USPC ........................... 370/216–240; 455/436–444
See application file for complete search history.

(56) References Cited

U.S. PATENT DOCUMENTS

| 2009/0141684 A1* | 6/2009 | Hashimoto et al. ........... 370/331 |
| 2010/0142367 A1* | 6/2010 | Zhang et al. .................. 370/216 |
| 2010/0189076 A1* | 7/2010 | Kim .............................. 370/331 |
| 2010/0331011 A1* | 12/2010 | Vikberg et al. ............ 455/456.1 |
| 2011/0058521 A1* | 3/2011 | Xu et al. ....................... 370/328 |
| 2011/0176414 A1* | 7/2011 | De Franca Lima et al. .. 370/230 |

FOREIGN PATENT DOCUMENTS

| WO | WO-2009095777 A1 | 8/2009 |
| WO | WO-2009117588 A1 | 9/2009 |

OTHER PUBLICATIONS

3rd Generation Partnership Project, Technical Specification Group Services and System Aspects, Circuit Switched Fallback in Evolved Packet System, Stage 2 (Release 9 ) , 3GPP Standard, 3GPP TS 23.272, 3rd Generation Partnership Project (3GPP), Mobile Competence Centre, 650, Route Des Lucioles, F-06921 Sophia-Antipolis Cedex, France, No. V9.1.0, Sep. 1, 2009, pp. 1-60, XP050363523.
3rd Generation Partnership Project, Technical Specification Group Services and System Aspects, General Packet Radio Service (GPRS) enhancements for Evolved Universal Terrestrial Radio Access Network (E-UTRAN) access (Release 9), Sep. 1, 2009, 3GPP Standard, 3GPP TS 23.401, 3rd Generation Partnership Project (3GPP), Mobile Competence Centre, 650, Route Des Lucioles, F-06921 Sophia-Antipolis Cedex, France, pp. 1-245, XP050363633.

(Continued)

*Primary Examiner* — Andrew Lai
*Assistant Examiner* — Jamaal Henson
(74) *Attorney, Agent, or Firm* — Michael J. DeHaemer, Jr.

(57) ABSTRACT

A CS fallback procedure handles conflict that may arise when handover operations occur during CS fallback. If CS fallback is initiated for an access terminal and handover of that access terminal is then initiated before the CS fallback completes, the target for the handover is informed of the CS fallback so that the target may perform the appropriate CS fallback operations.

60 Claims, 11 Drawing Sheets

(56) References Cited

OTHER PUBLICATIONS

International Search Report and Written Opinion—PCT/US2010/054839, ISA/EPO—May 3, 2011.

Taiwan Search Report—TW099137514—TIPO—Jun. 21, 2013.
3GPP TSG-RAN WG2 #66bis, "1xRTT CSFB with PS handover", R2-094004, Jul. 3, 2009, pp. 1-12.
Taiwan Search Report—TW099137514—TIPO—Mar. 17, 2014.

* cited by examiner

CIRCUIT SWITCHED FALLBACK PROCEDURE

CLAIM OF PRIORITY

This application claims the benefit of and priority to commonly owned U.S. Provisional Patent Application No. 61/256,479, filed Oct. 30, 2009, and U.S. Provisional Patent Application No. 61/259,013, filed Nov. 6, 2009, the disclosure of each of which is hereby incorporated by reference herein.

BACKGROUND

1. Field

This application relates generally to wireless communication and more specifically, but not exclusively, to circuit switched fallback procedures.

2. Introduction

A wireless communication network may be deployed over a defined geographical area to provide various types of services (e.g., voice, data, multimedia services, etc.) to users within that geographical area. In a typical implementation, access points (e.g., corresponding to different cells) are distributed throughout a network to provide wireless connectivity for access terminals (e.g., cell phones) that are operating within the geographical area served by the network.

In general, at a given point in time, an access terminal will be served by a given one of these access points. As the access terminal roams within a given cell associated with a current serving access point, signal conditions at the access terminal may change, whereby the access terminal may be better served by another access point. Consequently, the access terminal may be handed-over from its serving access point to the other access point to maintain mobility for the access terminal.

In addition, in some cases an access terminal on a packet switched (PS) network may need to be handed over or redirected to a circuit switched (CS) network. For example, some types of wireless networks are exclusively packet switched networks, whereby all traffic is routed through the core network via packets (e.g., Internet Protocol (IP) packets). However, some types of access terminals may support packet switched connectivity (e.g., for multimedia data) and circuit switched connectivity (e.g., for voice calls and Short Message Service (SMS) communication). Accordingly, a packet switched network may support handing-over or redirecting an access terminal to CS radio access technology (RAT). As a specific example, 3GPP evolved packet system (EPS) supports a CS fallback (CSFB) procedure that enables the provisioning of voice and other CS domain services (e.g., SMS) by reuse of CS infrastructure for an access terminal served by Evolved UMTS Terrestrial Radio Access Network (E-UTRAN). Thus, a CS fallback-enabled terminal initially connected to E-UTRAN may use a CS fallback procedure to access a CS domain (e.g., a 2G or 3G network) via GSM EDGE Radio Access Network (GERAN), UTRAN, cdma2000 RAN, or some other RAT.

Under certain circumstances, handover of an access terminal may be invoked during a CS fallback procedure. Accordingly, there is a need for effective techniques for handing CS fallback under these and other circumstances.

SUMMARY

A summary of several sample aspects of the disclosure follows. This summary is provided for the convenience of the reader and does not wholly define the breadth of the disclosure. For convenience, the term some aspects may be used herein to refer to a single aspect or multiple aspects of the disclosure.

The disclosure relates in some aspects to a robust CS fallback procedure that effectively handles conflict that may arise when handover and CS fallback procedures are invoked concurrently. For example, if CS fallback is initiated for an access terminal and handover of that access terminal is then initiated before the CS fallback completes, the target for the handover is informed of the CS fallback so that the target may complete the CS fallback.

The disclosure relates in some aspects to operations that may be performed by an entity such as a mobility manager to facilitate CS fallback. These operations initially involve sending a message comprising a CS fallback indicator to a serving access point for an access terminal. Then, upon determining that handover of the access terminal from a source access point to a target access point has been initiated, the message comprising the CS fallback indicator is resent to the target access point.

BRIEF DESCRIPTION OF THE DRAWINGS

These and other sample aspects of the disclosure will be described in the detailed description and the appended claims that follow, and in the accompanying drawings, wherein:

Figure 1:
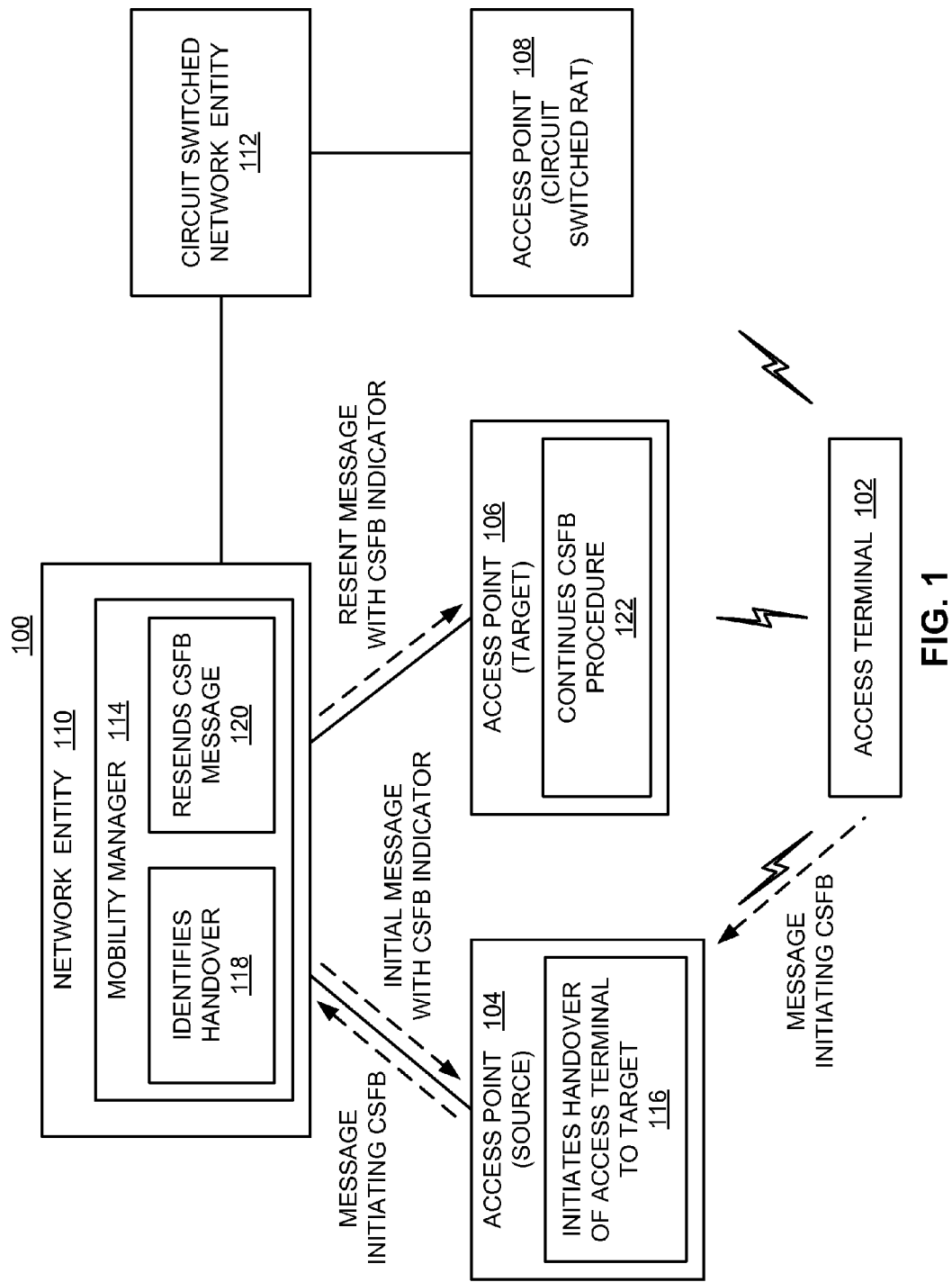
FIG. 1 is a simplified block diagram of several sample aspects of a communication system adapted to support CS fallback as taught herein.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of at least one communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, and so on, while access terminals may be referred to or implemented as user equipment (UE), mobile stations, and so on.

Access points in the system 100 provide one or more services (e.g., network connectivity) for one or more wireless terminals (e.g., access terminal 102) that may be installed within or that may roam throughout a coverage area of the system 100. For example, at various points in time the access terminal 102 may connect to an access point 104, an access point 106, an access point 108, or some other access point in the system 100 (not shown). Each of the access points may communicate with one or more network entities (represented, for convenience, by network entities 110 and 112) to facilitate wide area network connectivity.

These network entities may take various forms such as, for example, one or more radio and/or core network entities. Thus, in various implementations the network entities may represent functionality such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for access terminals; and providing access control for access terminals. Also, two of more of these network entities may be co-located and/or two or more of these network entities may be distributed throughout a network.

The system 100 is adapted to provide a robust CS fallback procedure even when a handover occurs during the fallback procedure. In the example of FIG. 1, the access point 104 is initially the serving access point for the access terminal 102. The access terminal 102 initiates CS fallback by sending a message (as represented by the corresponding dashed lines) to the network. In the example of FIG. 1, this message is sent to a mobility manager 114 such as a Mobility Management Entity (MME). In response to this message, the mobility manager 114 initially sends a message that includes a CS fallback indicator (as represented by the corresponding dashed line) to the current serving access point for the access terminal 102. In this way, the serving access point may commence appropriate CS fallback procedures for the access terminal 102.

Under certain circumstances, the access point 104 may determine (or assist in determining) that the access terminal 102 should be handed over to another access point. In the example of FIG. 1, the access point 104 is the source access point for the handover and the access point 106 is the target access point for the handover. Accordingly, the access point 104 initiates this handover as represented by functional block 116.

In some cases, handover of the access terminal is initiated after the mobility manager 114 receives the message that initiated the CS fallback procedure. In a conventional system, when the access terminal moves to the target access point 106, the previous CS fallback procedure through the source access point 104 is lost. This results in a very bad user experience. For example, an initiated CS call may be dropped and/or the access terminal 102 may fail to receive an incoming CS call.

To address such a problem, the mobility manager 114 is configured to determine if handover of the access terminal 102 occurs during a CS fallback procedure (as represented by the functional block 118). When this condition is identified, the mobility manager 114 resends a message with the CS fallback indicator to the target access point 106 (as represented by the functional block 120 and the corresponding dashed line). In this way, the target access point 106 may continue the CS fallback procedure (as represented by the functional block 122). Consequently, the target access point 106 may hand-over or redirect the access terminal 102 to a CS RAT (e.g., to access point 108).

Sample operations that may be performed to provide CS fallback as taught herein will now be described in more detail in conjunction with the flowchart of FIG. 2. For convenience, the operations of FIG. 2 (or any other operations discussed or taught herein) may be described as being performed by specific components (e.g., components of FIG. 1, FIG. 5, and FIG. 9). It should be appreciated, however, that these operations may be performed by other types of components and may be performed using a different number of components. It also should be appreciated that one or more of the operations described herein may not be employed in a given implementation.

Some types of access terminals support both CS connectivity and PS connectivity. Consequently, such an access terminal may obtain network access via CS RAT or PS RAT. In addition, some PS-only networks may support CS fallback for access terminals. For example, the PS network may provide an interface for communicating with a Mobile Switching Center (MSC) of the CS network. As a specific example, in 3GPP Long Term Evolution (LTE), a Mobility Management Entity (MME) may support an SGs interface to an MSC.

When a CS-capable and PS-capable access terminal registers with a PS-only network (e.g., registers at an MME of an LTE network), the access terminal may indicate that it also wants to register with a CS network. In this case, the PS network (e.g., the MME) registers the access terminal with the MSC. In this way, when the access terminal is on the PS network, a mechanism is provided for enabling the access terminal to fall-back to the CS domain if needed.

At some point in time an access terminal on PS RAT may thus determine that it needs to access CS RAT. For example, an access terminal currently communicating via an LTE network may determine that it needs to communication with a CS network (e.g., GERAN, UTRAN, or cdma2000) for voice communication, SMS communication, or some other type of CS communication. In some cases, the access terminal determines that it needs CS access as a result of a user of the access terminal initiating a call or SMS message (e.g., by actuating a user input device on the access terminal). In some cases, the access terminal determines that it needs CS access as a result of receiving a page, where the page indicates that it is for a CS domain. For example, when an incoming call (or SMS message) arrives at the MSC, the MSC sends a page to the MME, which then pages the access terminal through the LTE network.

Figure 2:
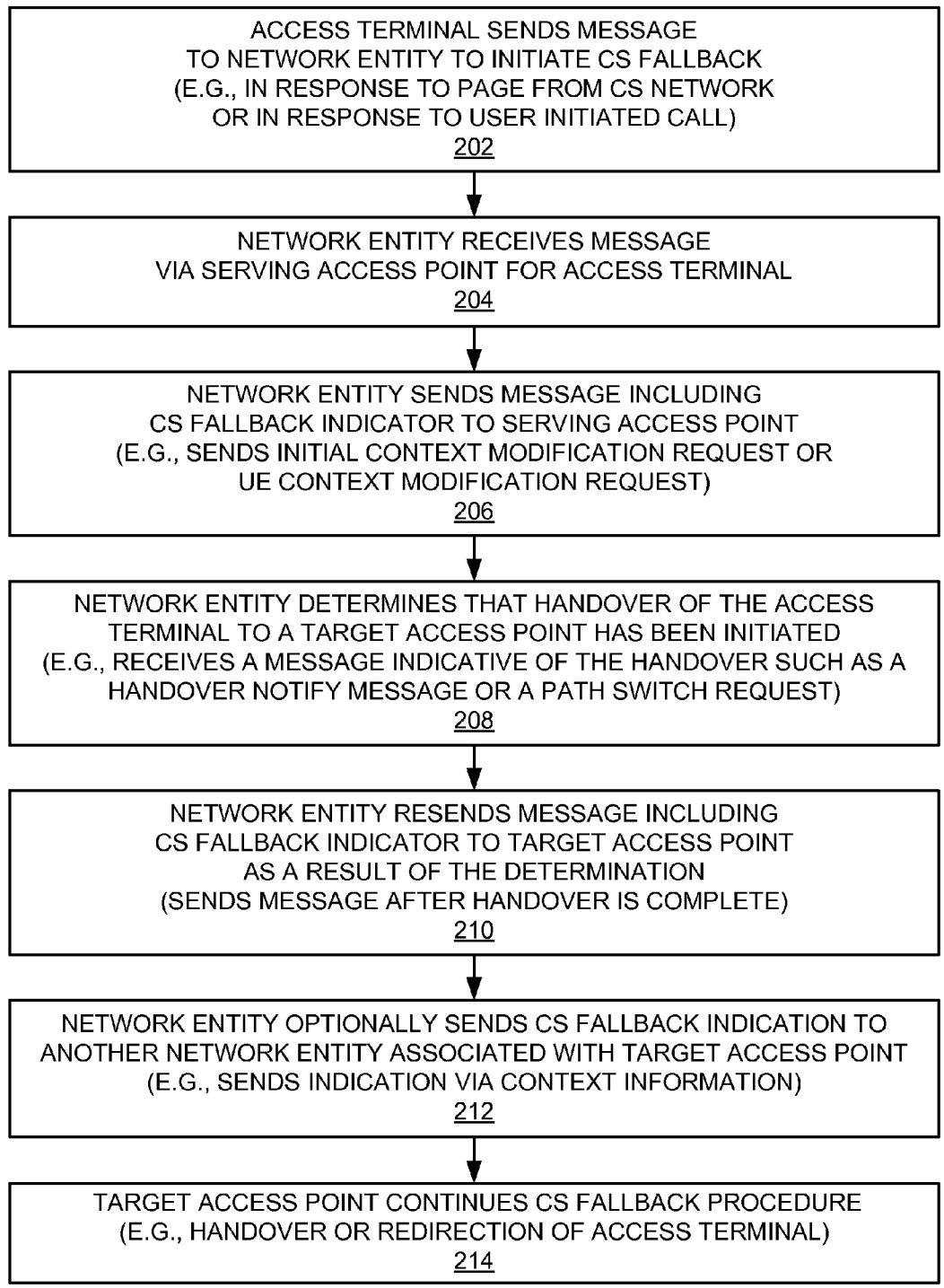
FIG. 2 is a flowchart of several sample aspects of operations that may be performed to provide CS fallback as taught herein.

As represented by block 202 of FIG. 2, upon determining that it needs access to a CS network, the access terminal sends a message to its current serving network to inform the network of the need to switch to the CS domain. For example, in an LTE network, the access terminal (i.e., UE) may send an Extended Service Request message to an MME network entity that manages mobility for that access terminal. In this case, the Extended Service Request message includes an indication that the access terminal desires CS fallback.

The network then receives the message from the access terminal as represented by block 204. For example, in an LTE network, the current MME for the access terminal receives the message via the serving eNodeB for the access terminal.

Upon receiving this message, the network takes action to provide CS fallback for the access terminal. As represented by block 206, a network entity (e.g., the MME) sends a message that includes a CS fallback indicator to the serving access point to inform the serving access point that the access terminal is to be handed-over or redirected to a CS RAT. For example, in a case where the access terminal was in idle mode before the CS fallback procedure commenced, the MME may send an Initial Context Setup Request that includes a CS fallback indicator to the serving access point. As another example, in a case where the access terminal was in active mode before the CS fallback procedure commenced, the MME may send a UE Context Modification Request that includes a CS fallback indicator to the serving access point.

Under certain circumstances, handover of the access terminal may commence during the CS fallback procedure. For example, based on measurement reports from the access terminal, the serving access point may determine that the access terminal would be better served by another access point. In this case, the serving access point may initiate handover (e.g., X1 or S1 handover) of the access terminal. Accordingly, as represented by block 208, the network entity (e.g., MME) may thus determine that handover of the access terminal to a target access point has been initiated (e.g., the network entity determines that the access terminal is being handed over to a target access point during the CS fallback procedure).

The network entity may determine that handover has been initiated in various ways. In some cases, the network entity receives a message that indicates that the handover is in progress or that the handover has completed. For example, for an S1 handover, the network entity may receive a handover notify (e.g., handover required) message from the serving access point. As another example, for an X2 handover, the network entity may receive a path switch request message from the target access point.

The network entity may determine that handover is taking place during CS fallback in various ways. For example, this may involve determining that a message indicative of handover is received after the network entity sent the message at block 206. Here, it should be appreciated that handover may have been commenced (e.g., the message indicative of handover may have been sent) before the network entity sent the message at block 206.

In some cases, handover taking place during CS fallback is indicated when the network entity receives a message indicative of the handover instead of a response to the message sent at block 206. For example, in the event an MME sent an Initial Context Setup Request including a CS fallback indicator, the reception of a handover notify or path switch request message at the MME instead of an Initial Context Setup Response indicates that handover occurred during CS fallback. Similarly, in the event an MME sent a UE Context Modification Request including a CS fallback indicator, the reception of a handover notify or path switch request message at the MME instead of a UE Context Modification Response indicates that handover occurred during CS fallback.

As represented by block 210, as a result of the determination of block 208, the network entity resends a message including the CS fallback indicator to the target access point. For example, an MME may send an Initial Context Setup Request that includes a CS fallback indicator or a UE Context Modification Request that includes a CS fallback indicator to the target access point after the handover is complete. Here, completion of handover may be indicated, for example, by reception of a handover complete message, a handover notify message, a path switch request message, or some other suitable message at the MME.

As represented by block 212, some implementations may support the transfer of context information between different network entities (e.g., MMEs) associated with the source and target access points. For example, the source access point may be managed by a first MME and the target access point managed by a second MME. In this case, when the first MME determines that a handover involving an MME change is occurring during CS fallback, the first MME may send an indication of the CS fallback for the access terminal to the second MME. For example, the first MME may include a CS fallback indictor in context information sent to the second MME. In this way, the second MME may resume the CS fallback procedure after the handover is complete.

As represented by block 214, upon receiving a message with the CS fallback indicator, the target access point continues the CS fallback procedure for the access terminal. For example, the target access point may handover the access terminal to the CS RAT (e.g., via PS handover or Network Assisted Cell Change (NACC)) by sending a handover message to the access terminal and forwarding context information to an appropriate CS access point. Alternatively, the target access point may redirect the access terminal to the CS RAT (e.g., by sending a Radio Resource Control (RRC) release message to the access terminal). In the latter case, the access terminal may simply show up at the CS RAT and provide context information to gain access there. Once the access terminal moves to the CS RAT (e.g., 2G or 3G), the access terminal may perform a CS call setup procedure or other applicable CS setup procedure.

Figure 3:
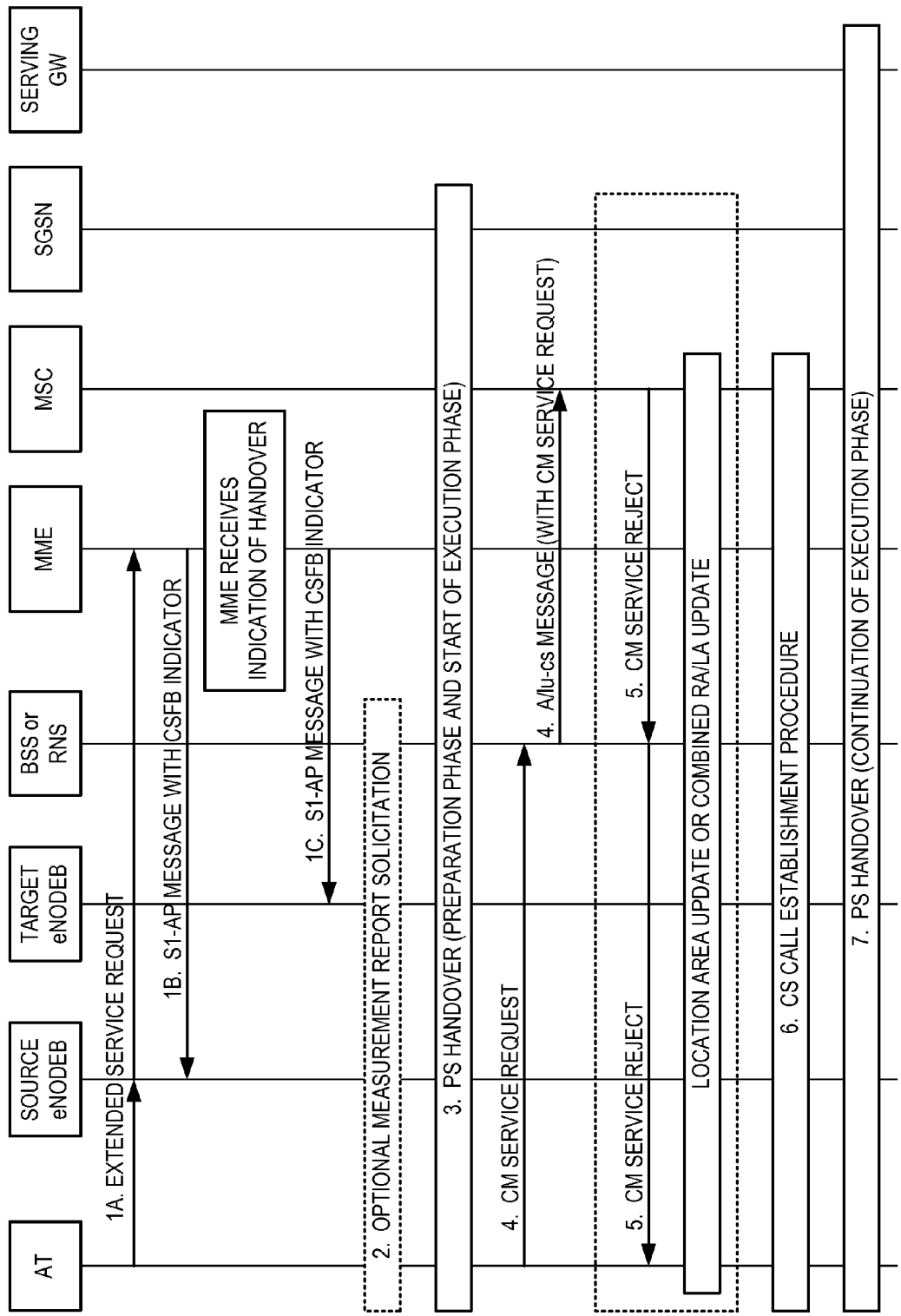
FIG. 3 is a simplified diagram of sample call flow for CS fallback as taught herein.

To further illustrate how and when a network entity may resend a CS fallback indication, reference is made to FIG. 3 which illustrates an example of call flow for a CS fallback procedure. In this example, CS fallback to GERAN or UTRAN is provided in an LTE network.

At step 1A, at some point in time after the access terminal (AT) connects to the E-UTRAN network, the access terminal (e.g., which may be referred to as a UE or mobile station) sends an Extended Service Request to the MME. As discussed herein, the Extended Service Request indicates that the access terminal wishes to be sent to another RAT that supports CS.

At step 1B, the MME sends an S1-AP message including a CS fallback indicator to the source eNodeB to inform the source eNodeB that the access terminal needs CS fallback service. As discussed above, the S1-AP message may comprise an Initial Context Setup Request or a UE Context Modification Request.

As discussed herein, the source eNodeB may initiate a handover procedure to a target eNodeB during the CS fallback procedure. Accordingly, the MME may receive an indication of the handover (e.g., from the source eNodeB or the target eNodeB) after it sends the message at step 1B.

Consequently, as represented by step 1C, the MME resends an S1-AP message including a CS fallback indicator to the target eNodeB to cause the target eNodeB to send the access terminal to the CS domain (e.g., 2G or 3G). Again, the S1-AP message may comprise an Initial Context Setup Request or a UE Context Modification Request. In the former case, the target eNodeB may reply with an Initial Context Setup Response and then send the access terminal to the CS domain (e.g., 2G or 3G). In the latter case, the target eNodeB may reply with a UE Context Modification Response and then send the access terminal to the CS domain.

Steps 2-7 describe sample operations that may be performed in an implementation where the access terminal is handed-over to GERAN or UTRAN for CS fallback. In the former case, the access terminal is handed-over to a Base Station Subsystem (BSS), while in the latter case, the access terminal is handed-over to a Radio Network Subsystem (RNS).

Step 2 is an optional step that may be employed, for example, in the event the access terminal is within the coverage of multiple CS cells. In this case, measurement report information provided by the access terminal may be used to select the best BSS cell or RNS cell for the CS fallback. Alternatively, in a case where there is a single known CS cell in the area, the target eNodeB may simply send the access terminal to that CS cell.

Steps 3-7 relate to completing the CS call. At step 3, the target eNodeB sends context information for the access terminal to the BSS or RNS. At step 4, the access terminal initiates a Connection Management (CM) Service Request. The dashed block represents a scenario where the MSC is changed. In this case, the MSC sends a CM Service Reject at step 5, and a Location Area Update or a combined Routing Area/Location Area (RA/LA) is performed. At step 6, CS call establishment procedures are performed, and the handover is completed at step 7.

It should be appreciated that the specific operations and the ordering of the operations of FIG. 3 are merely representative. In other cases, some of the described operations may be performed by other entities. For example, the source eNodeB may commence some of the CS fallback operations prior to deciding that the access terminal needs to be handed-over to the target access point. Also, in some cases, the MME may determine that handover is in progress after the MME receives the message at step 1A but before the MME sends the message at step 1B.

Figure 4:
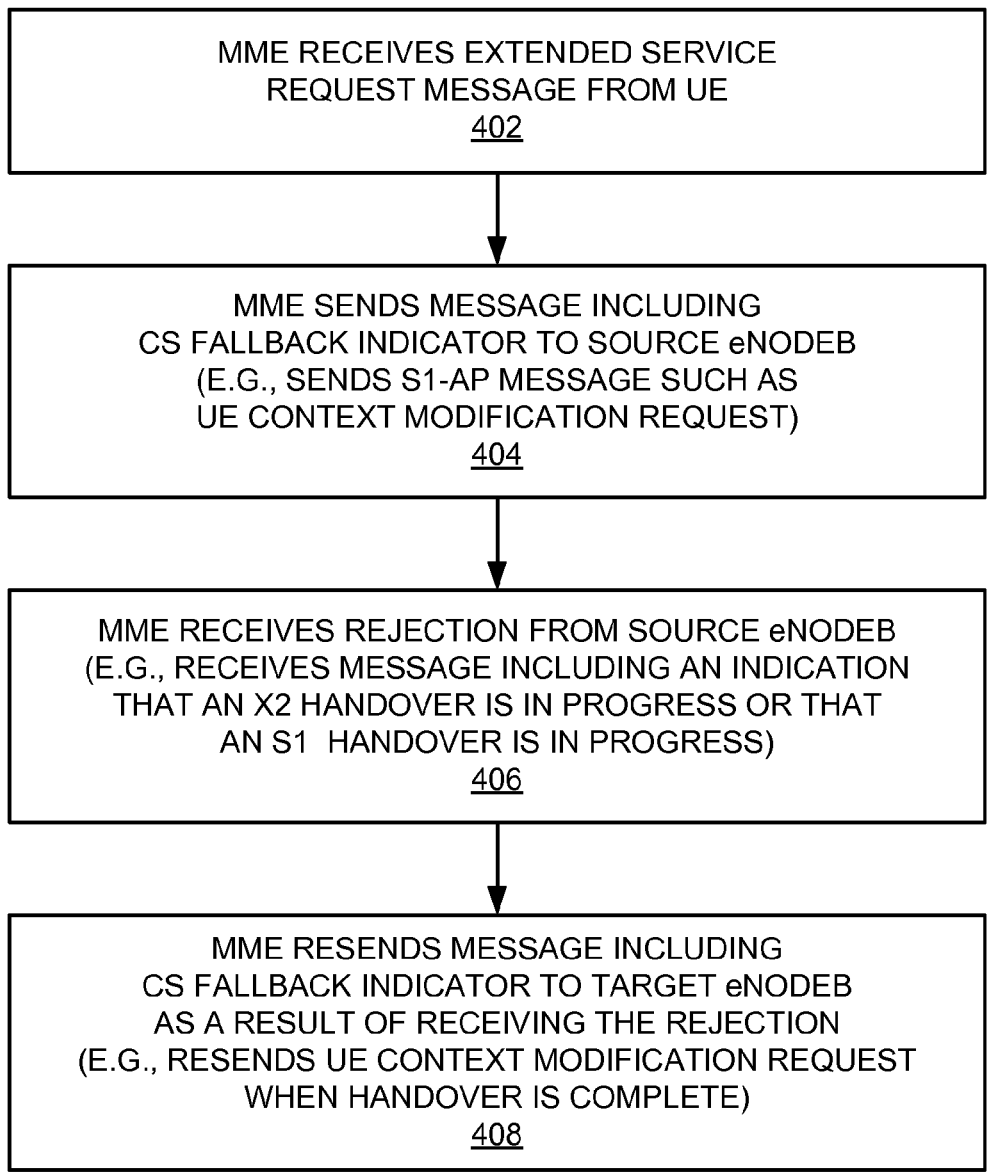
FIG. 4 is a flowchart of several sample aspects of operations that may be performed to facilitate CS fallback during X2 handover (e.g., handover via a direct interface between eNodeBs) or S1 handover (e.g., handover via an eNodeB to MME interface)

In some implementations, a network entity may determine that handover is occurring during CS fallback based on reception of a rejection message from the source eNodeB. FIG. 4 describes an example of operations that may be performed by a network entity in such a case. For purposes of illustration, the example of an MME and UE is used here. These operations may be employed in a case involving X2 handover or S1 handover.

As represented by block 402, the MME receives an Extended Service Request Message from a UE. As discussed herein, the message indicates that CS fallback is to be provided for the access terminal.

As represented by block 404, the MME sends a message including a CS fallback indicator to the source eNodeB for the access terminal. For example, the MME may perform an S1 interface procedure whereby a UE Context Modification Request is sent to the source eNodeB.

Since the source eNodeB has initiated handover in this case, the source eNodeB sends back a rejection in response to the reception of the message sent at block 404. For example, the source eNodeB may send a message that comprises an indication that handover (e.g., X2 handover or S1 handover) of the access terminal is in progress. Accordingly, the MME receives this rejection as represented by block 406.

As represented by block 408, the MME resends a message including the CS fallback indicator to the target eNodeB. For example, if the handover is completed, the MME may reattempt the S1 interface procedure by sending a UE Context Modification Request to the target eNodeB.

Figure 5:
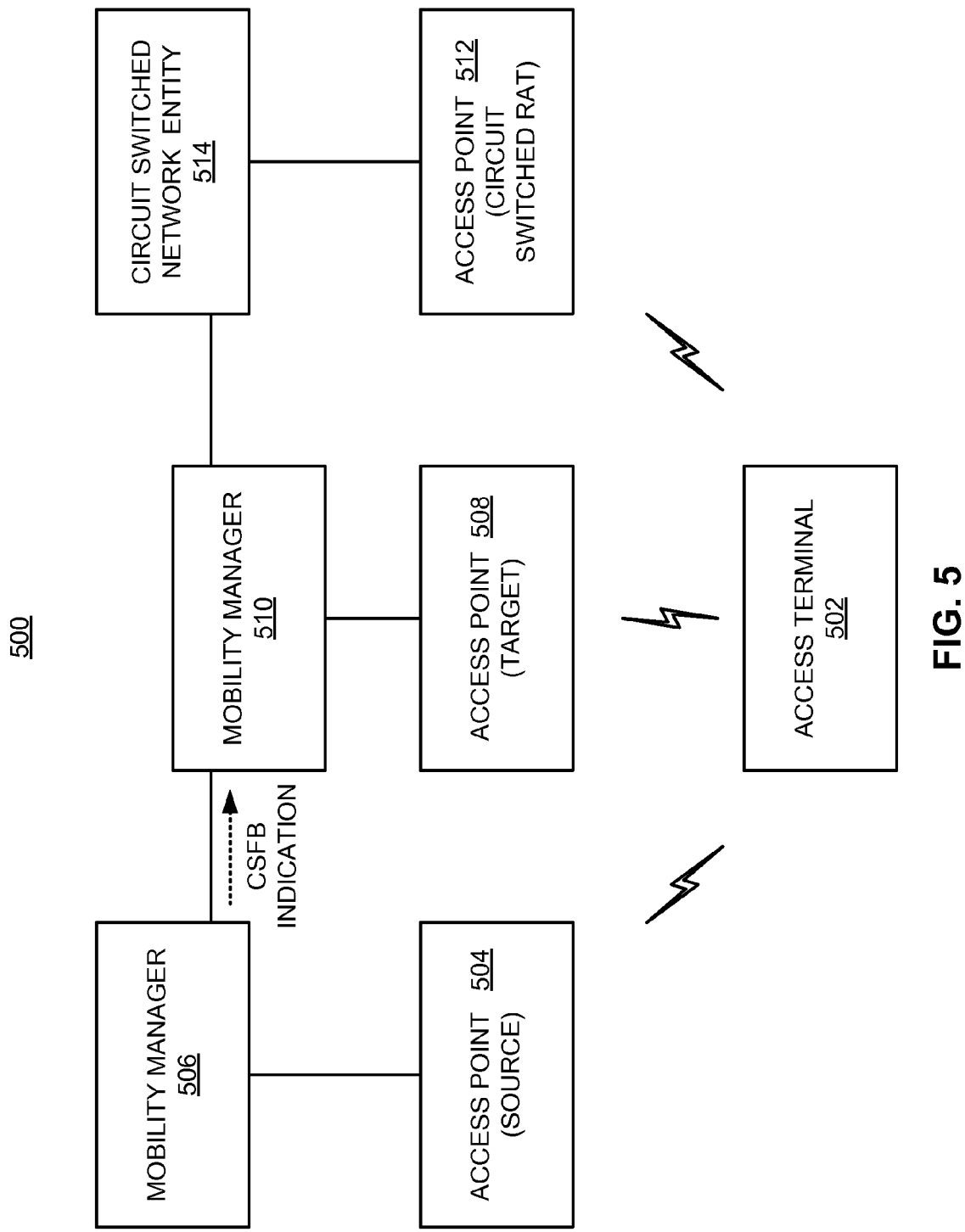
FIG. 5 is a simplified block diagram of several sample aspects of a communication system adapted to support sending CS fallback information between mobility managers.

As mentioned above, in some cases a source access point and a target access point are managed by different network entities (e.g., different MMEs). FIG. 5 illustrates an example of such a scenario. Here, an access terminal 502 is initially served by an access point 504. The access point 504, in turn, is managed by a mobility manager 506. During a CS fallback procedure, a decision is made to hand-over the access terminal 502 to an access point 508. However, the access point 508 is managed by a mobility manager 510. Accordingly, to facilitate the CS fallback procedure at the access point 508, the mobility manager 506 sends a CS fallback indication to the mobility manager 510 (e.g., along with context information for the access terminal 502). The mobility manager 510 may then inform the access point 508 (e.g., by sending a message including a CS fallback indicator) that the access terminal 502 has requested CS fallback service. The access point 508 may then handover or direct the access terminal 502 to an access point 512 associated with CS RAT. To this end, the mobility manager 510 may have an interface (e.g., an SGs interface) with a network entity 514 (e.g., an MSC) of the CS network to which the access point 512 is connected.

Figure 6:
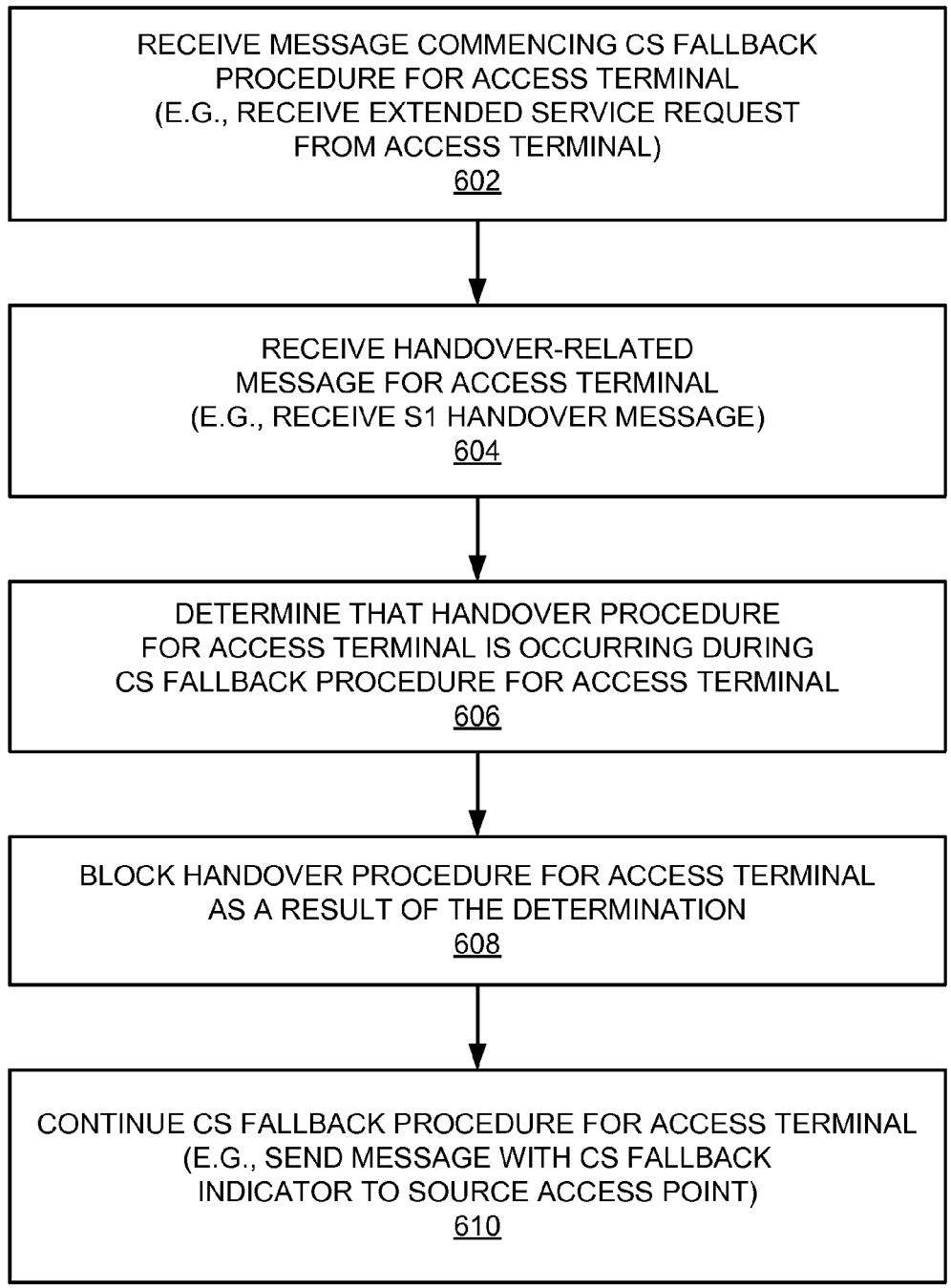
FIG. 6 is a flowchart of several sample aspects of operations that may be performed in conjunction with blocking a handover procedure that occurs during CS fallback.
Figure 7:
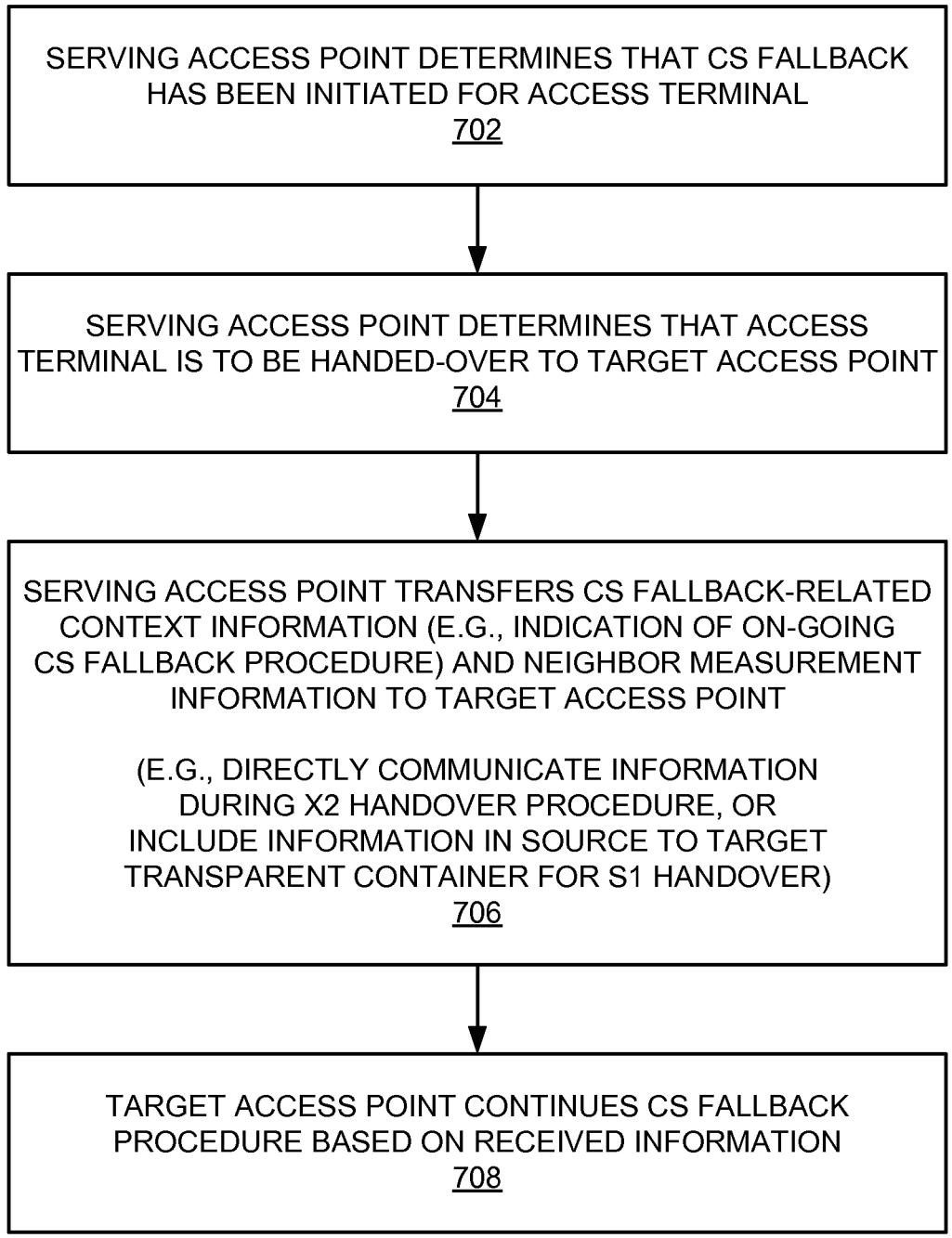
FIG. 7 is a flowchart of several sample aspects of operations that may be performed in conjunction with transferring CS fallback information during handover.
Figure 8:
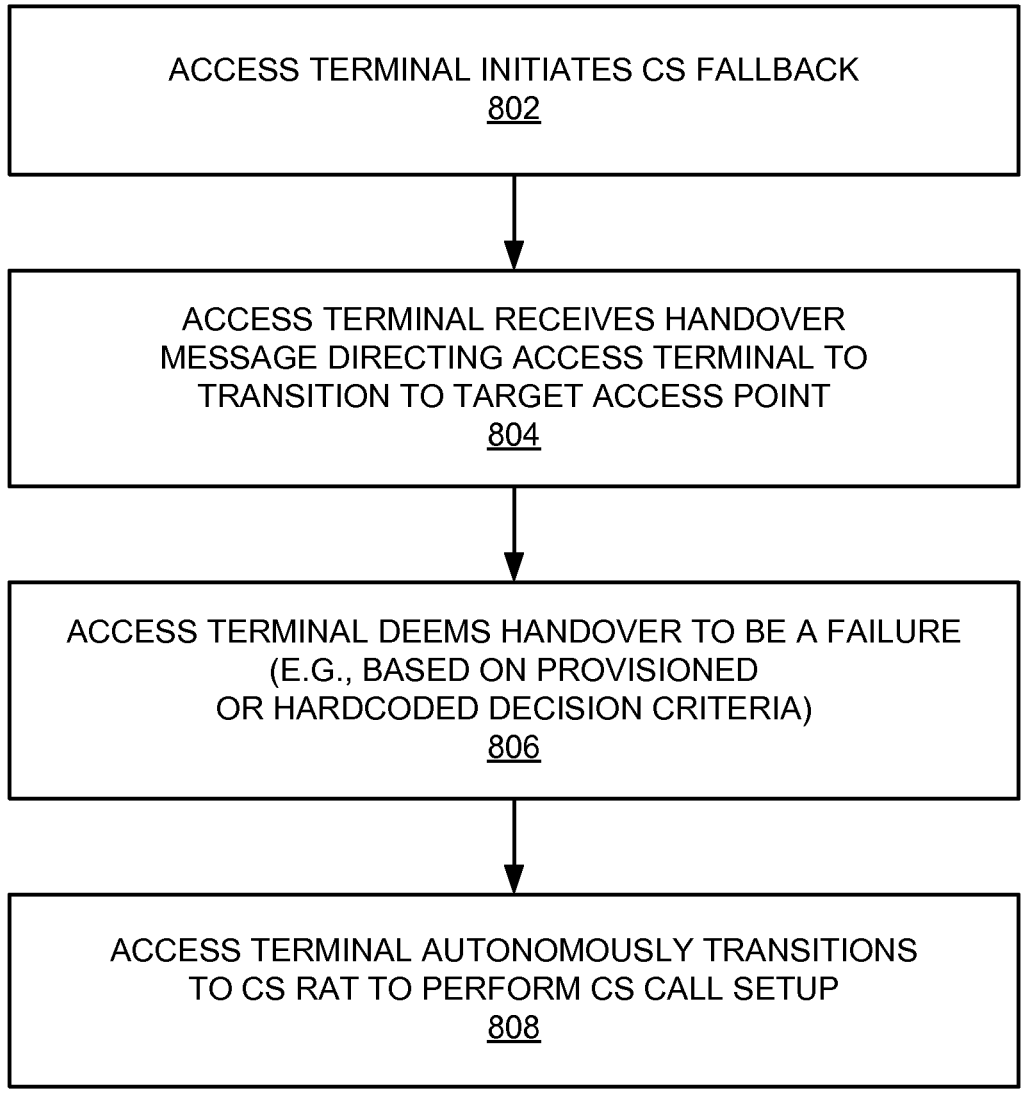
FIG. 8 is a flowchart of several sample aspects of operations that may be performed in conjunction with an access terminal transitioning to CS radio access technology (RAT) if handover is indicated.

FIGS. 6-8 describe other techniques may be employed to address handover during CS fallback.

FIG. 6 describes a scheme where a network entity (e.g., MME) blocks handover of the access terminal during a CS fallback procedure. This scheme may be employed, for example, in an implementation where handover messages from the access points are sent to the network entity (e.g., for S1 handover).

As represented by block 602, the network entity receives a message commencing a CS fallback procedure for an access terminal. For example, an MME may receive an Extended Service Request from an access terminal.

As represented by block 604, the network entity then receives a handover-related message for the access terminal. For example, an MME may receive a handover notify (e.g., handover required) message from a source access point. Consequently, as represented by block 606, the network entity determines that handover is occurring during the CS fallback procedure.

As a result of the determination of block 606, the network entity blocks the handover procedure (as represented by block 608). For example, an MME may stop the handover message exchange between the source and target access points.

While blocking the handover procedure, the network entity may continue with the CS fallback procedure as represented by block 610. For example, the MME may send a UE Context Modification Request (or other suitable message) including a CS fallback indicator to the source access point. Here, the source access point may be configured such that CS fallback has higher priority than handover. Thus, the source access point will abort the handover and proceed with the CS fallback.

FIG. 7 describes a scheme where a source access point transfers CS fallback-related context information to a target access point in the event handover is commenced during CS fallback.

As represented by block 702, the serving access point for an access terminal determines that CS fallback has been initiated for the access terminal. For example, the serving access point may receive a message (e.g., from the access terminal or a network entity) that includes a CS fallback indictor.

As represented by block 704, the serving access point determines that the access terminal is to be handed-over to another access point (e.g., based on current signal condition at the access terminal).

As represented by block 706, as a result of determining that handover and CS fallback procedures are occurring concurrently, the serving access point transfers CS fallback-related context information (e.g., including an indication (such as a flag) of the ongoing CS fallback procedure) and neighbor measurement information to the target access point in conjunction with handover of the access terminal to the target access point. For an X2 handover, this CS fallback-related information may be directly communicated between the access points during a handover preparation procedure. For an S1 handover, this information may be included in a source access point to target access point transparent container.

As represented by block 708, as a result of receiving the CS fallback-related information, the target access may continue the CS fallback procedure for the access terminal. For example, the target access point may resume the CS fallback procedure from the point where the source access point paused the CS fallback procedure due to the handover.

In some cases, the scheme of FIG. 7 may involve requesting the access terminal to perform pilot measurements again. In this case, the access terminal may provide new measurement report information after performing a new measurement, or the access terminal may simply send measurement report information that was stored after an earlier measurement.

FIG. 8 describes a scheme where an access terminal treats a handover commenced during CS fallback as a failure. As represented by block 802, the access terminal initiates CS fallback (e.g., as discussed above). As represented by block 804, the access terminal receives a handover message directing the access terminal to transition to a target access point. As represented by block 806, since CS fallback has been invoked for the access terminal, the access terminal deems the handover to be a failure. Here, this decision may be based on, for example, decision criteria (e.g., a flag) that is hardcoded into the access terminal or that is provisioned into the access terminal (e.g., by an operator via a network entity). As represented by block 808, as a result of deeming the handover to be a failure, the access terminal autonomously transitions to a CS-capable RAT (e.g., GERAN, UTRAN, cdma2000) to perform CS call setup or other suitable CS setup operations.

In some cases, an access terminal may be configured to invoke the operations of FIG. 8 only for inter-access point handover. Here, in the event the access terminal determines that a handover is intra-access point (e.g., by comparing cell global identifiers of the source and target cells), the access terminal may stay at the target cell waiting for further CS fallback procedures from the network.

Figure 9:
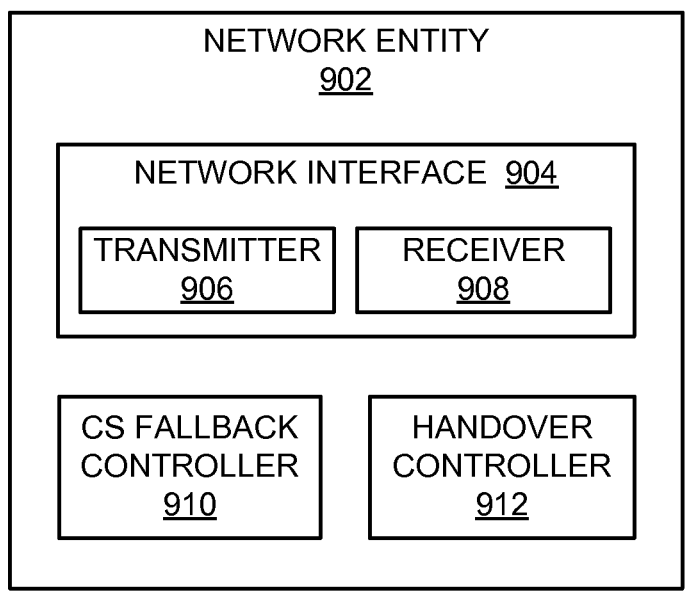
FIG. 9 is a simplified block diagram of several sample aspects of components that may be employed in communication nodes.

FIG. 9 illustrates several sample components that may be incorporated into nodes such as a network entity 902 (e.g., corresponding to the mobility manager 114) to support CS fallback operations as taught herein. The described components may be incorporated into other nodes in a communication system. For example, other nodes in a system may include components similar to those described for the network entity 902 to provide similar functionality. Also, a given node may contain one or more of the described components.

The network entity 902 includes a network interface 904 for communicating with other nodes (e.g., other network nodes). For example, the network interface 904 may be configured to communicate with one or more network nodes via a wire-based or wireless backhaul. In some aspects, the network interface 904 may be implemented as a transceiver configured to support wire-based or wireless communication. To this end, the network interface 904 is depicted as including a transmitter component 906 (e.g., for sending messages and indications) and a receiver component 908 (e.g., for receiving messages and indications).

The network entity 902 also includes other components that may be used in conjunction with CS fallback operations as taught herein. For example, the network entity 902 includes a CS fallback controller 910 for performing CS fallback-related procedures (e.g., sending a message including a CS fallback indicator, resending a message including a CS fallback indicator as a result of a determination that handover of an access terminal has been initiated, sending an indication of CS fallback to a mobility management entity) and for providing other related functionality as taught herein. In addition, the network entity 902 includes a handover controller 912 for performing handover-related procedures (e.g., determining that handover of an access terminal has been initiated) and for providing other related functionality as taught herein.

In some implementations the components of FIG. 9 may be implemented in one or more processors (e.g., each of which uses and/or incorporates data memory for storing information or code used by the processor to provide this functionality). For example, some of the functionality of block 904 and some or all of the functionality of blocks 910 and 912 may be implemented by a processor or processors of a network entity and data memory of the network entity (e.g., by execution of appropriate code and/or by appropriate configuration of processor components).

Also, related functionality may be provided in access terminals and access points in a system. For example, an access terminal and an access point may include respective transceivers for communicating with one another and with other nodes (e.g., network entities). Each transceiver includes a transmitter for sending signals (e.g., messages and indications) and a receiver 308 for receiving such signals. Furthermore, the access terminals and access points may include CS fallback controllers for performing CS fallback-related procedures and handover controllers for performing handover-related procedures as taught herein. In addition, the components of these access terminals and access points may be implemented in one or more processors (e.g., each of which uses and/or incorporates data memory for storing information or code used by the processor to provide this functionality).

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 10:
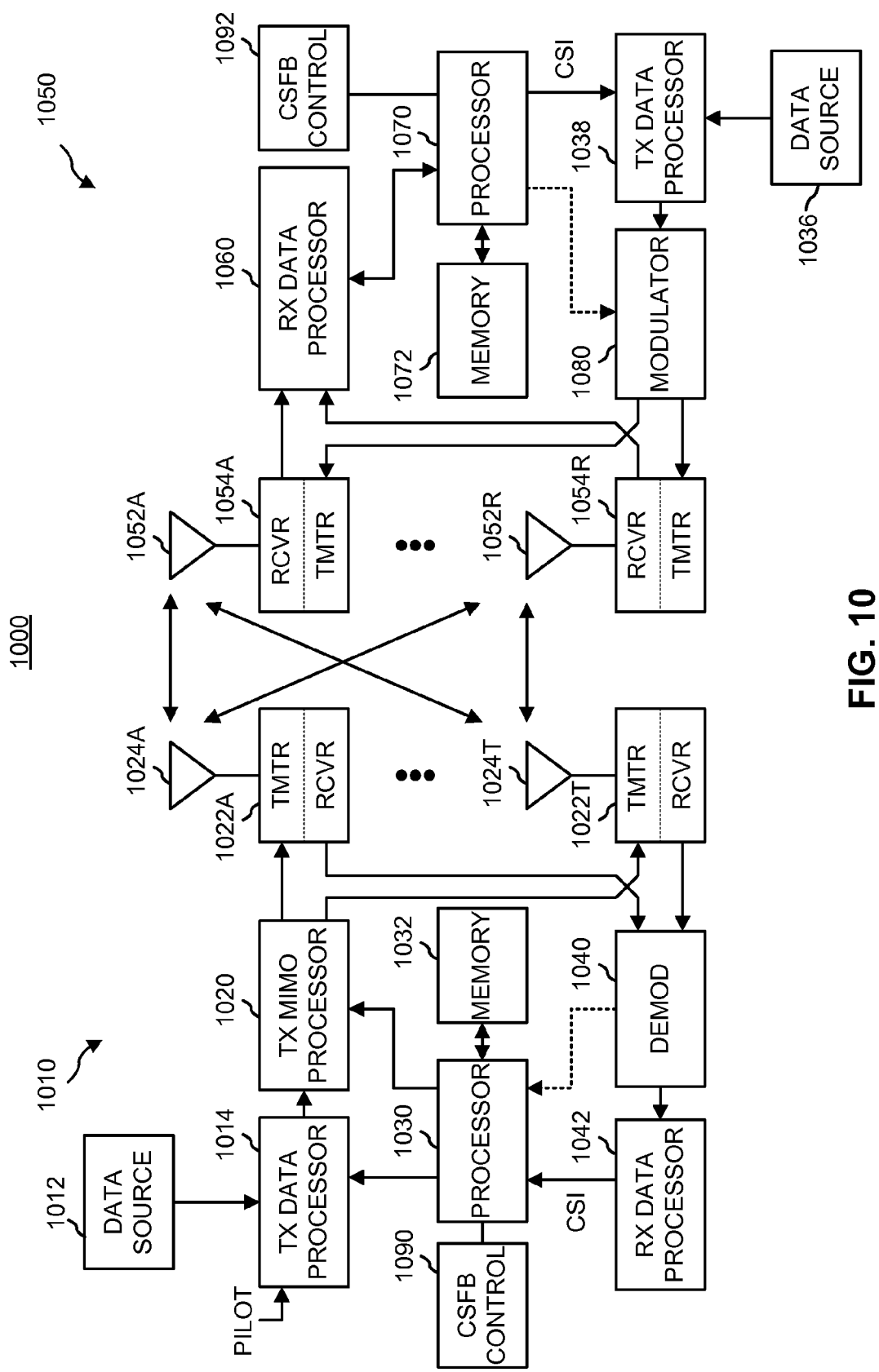
FIG. 10 is a simplified block diagram of several sample aspects of communication components.

FIG. 10 illustrates a wireless device 1010 (e.g., an access point) and a wireless device 1050 (e.g., an access terminal) of a sample MIMO system 1000. At the device 1010, traffic data for a number of data streams is provided from a data source 1012 to a transmit (TX) data processor 1014. Each data stream may then be transmitted over a respective transmit antenna.

The TX data processor 1014 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1030. A data memory 1032 may store program code, data, and other information used by the processor 1030 or other components of the device 1010.

The modulation symbols for all data streams are then provided to a TX MIMO processor 1020, which may further process the modulation symbols (e.g., for OFDM). The TX MIMO processor 1020 then provides $N_T$ modulation symbol streams to $N_T$ transceivers (XCVR) 1022A through 1022T. In some aspects, the TX MIMO processor 1020 applies beam-forming weights to the symbols of the data streams and to the antenna from which the symbol is being transmitted.

Each transceiver 1022 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1022A through 1022T are then transmitted from $N_T$ antennas 1024A through 1024T, respectively.

At the device 1050, the transmitted modulated signals are received by $N_R$ antennas 1052A through 1052R and the received signal from each antenna 1052 is provided to a respective transceiver (XCVR) 1054A through 1054R. Each transceiver 1054 conditions (e.g., filters, amplifies, and downconverts) a respective received signal, digitizes the conditioned signal to provide samples, and further processes the samples to provide a corresponding "received" symbol stream.

A receive (RX) data processor 1060 then receives and processes the $N_R$ received symbol streams from $N_R$ transceivers 1054 based on a particular receiver processing technique to provide $N_T$ "detected" symbol streams. The RX data processor 1060 then demodulates, deinterleaves, and decodes each detected symbol stream to recover the traffic data for the data stream. The processing by the RX data processor 1060 is complementary to that performed by the TX MIMO processor 1020 and the TX data processor 1014 at the device 1010.

A processor 1070 periodically determines which pre-coding matrix to use (discussed below). The processor 1070 formulates a reverse link message comprising a matrix index portion and a rank value portion. A data memory 1072 may store program code, data, and other information used by the processor 1070 or other components of the device 1050.

The reverse link message may comprise various types of information regarding the communication link and/or the received data stream. The reverse link message is then processed by a TX data processor 1038, which also receives traffic data for a number of data streams from a data source 1036, modulated by a modulator 1080, conditioned by the transceivers 1054A through 1054R, and transmitted back to the device 1010.

At the device 1010, the modulated signals from the device 1050 are received by the antennas 1024, conditioned by the transceivers 1022, demodulated by a demodulator (DEMOD) 1040, and processed by a RX data processor 1042 to extract the reverse link message transmitted by the device 1050. The processor 1030 then determines which pre-coding matrix to use for determining the beam-forming weights then processes the extracted message.

FIG. 10 also illustrates that the communication components may include one or more components that perform CS fallback control operations as taught herein. For example, a CS fallback control component 1090 may cooperate with the processor 1030 and/or other components of the device 1010 to assist in a CS fallback procedure for another device (e.g., device 1050) as taught herein. Similarly, a CS fallback control component 1092 may cooperate with the processor 1070 and/or other components of the device 1050 to initiate and/or perform CS fallback with another device (e.g., device 1010). It should be appreciated that for each device 1010 and 1050 the functionality of two or more of the described components may be provided by a single component. For example, a single processing component may provide the functionality of the CS fallback control component 1090 and the processor 1030 and a single processing component may provide the functionality of the CS fallback control component 1092 and the processor 1070.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1xRTT, 1xEV-DO Rel0, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 11:
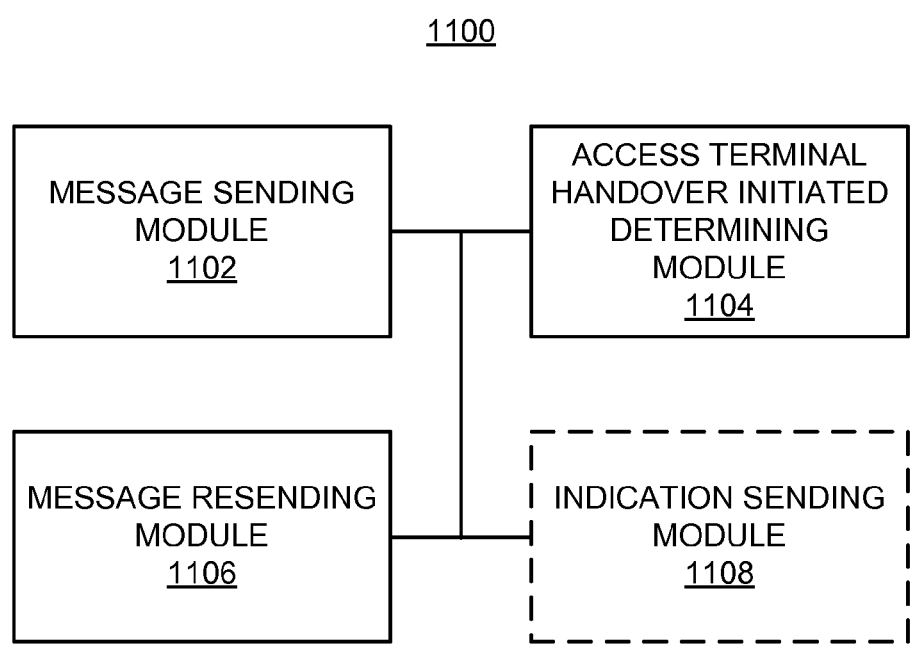
FIG. 11 is a simplified block diagram of several sample aspects of an apparatus configured to provide CS fallback as taught herein.

The functionality described herein (e.g., with regard to one or more of the accompanying figures) may correspond in some aspects to similarly designated "means for" functionality in the appended claims. Referring to FIG. 11, an apparatus 1100 is represented as a series of interrelated functional modules. Here, a message sending module 1102 may correspond at least in some aspects to, for example, a circuit switched fallback controller as discussed herein. An access terminal handover initiated determining module 1104 may correspond at least in some aspects to, for example, a handover controller as discussed herein. A message resending module 1106 may correspond at least in some aspects to, for example, a circuit switched fallback controller as discussed herein. An indication sending module 1108 may correspond at least in some aspects to, for example, a circuit switched fallback controller as discussed herein.

The functionality of the modules of FIG. 11 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIG. 11 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
    sending a first message to a first access point, wherein the first message includes a circuit switched fallback indicator associated with a circuit switched fallback procedure for an access terminal;
    determining, after the first message is sent to the first access point, that handover of the access terminal from the first access point to a second access point has been initiated during the circuit switched fallback procedure at the first access point; and
    sending a second message to the second access point as a result of the determination, wherein the second message sent to the second access point includes the circuit switched fallback indicator associated with the circuit switched fallback procedure for the access terminal.

2. The method of claim 1, wherein the first message sent to the first access point comprises a UE Context Modification Request.

3. The method of claim 1, wherein the first message sent to the first access point comprises an Initial Context Setup Request.

4. The method of claim 1, wherein determining comprises receiving another message that is indicative of the handover of the access terminal.

5. The method of claim 4, wherein the another message comprises a handover notify message.

6. The method of claim 4, wherein the another message comprises a path switch request message.

7. The method of claim 1, wherein the first and second messages sent to the first and second access points respectively, comprise UE Context Modification Requests that include the circuit switched fallback indicator.

8. The method of claim 1, wherein sending the second message to the second access point comprises sending the second message to the second access point if the handover of the access terminal is completed.

9. The method of claim 1, wherein determining that the handover has been initiated comprises determining that the handover is complete based on reception of a handover notify message.

10. The method of claim 1, wherein determining that the handover has been initiated comprises determining that the handover is complete based on reception of a path switch request message.

11. The method of claim 1, further comprising sending, as a result of the determination, an indication of circuit switched fallback for the access terminal from a first mobility management entity associated with the first access point to a second mobility management entity associated with the second access point.

12. The method of claim 11, wherein the indication is included in context information sent from the first mobility management entity to the second mobility management entity.

13. The method of claim 1, wherein:
determining comprises receiving a rejection to the first message sent to the first access point; and
the rejection comprises an indication that the handover is in progress.

14. The method of claim 1, wherein:
sending the first message to the first access point comprises an S1 interface procedure; and
determining comprises receiving a rejection to the S1 interface procedure; and
the rejection comprises an indication that the handover is in progress.

15. The method of claim 14, wherein sending the second message to the second access point comprises reattempting the S1 interface procedure with the second access point if the handover is completed.

16. An apparatus for communication, comprising:
a circuit switched fallback controller configured to send a first message to a first access point, wherein the first message includes a circuit switched fallback indicator associated with a circuit switched fallback procedure for an access terminal; and
a handover controller configured to determine, after the first message is sent to the first access point, that handover of the access terminal from the first access point to a second access point has been initiated during the circuit switched fallback procedure at the first access point, wherein the circuit switched fallback controller is further configured to send a second message to the second access point as a result of the determination, and wherein the second message sent to the second access point includes the circuit switched fallback indicator associated with the circuit switched fallback procedure for the access terminal.

17. The apparatus of claim 16, wherein the first message sent to the first access point comprises a UE Context Modification Request.

18. The apparatus of claim 16, wherein the first message sent to the first access point comprises an Initial Context Setup Request.

19. The apparatus of claim 16, wherein the determining comprises receiving another message that is indicative of the handover of the access terminal.

20. The apparatus of claim 19, wherein the another message comprises a handover notify message.

21. The apparatus of claim 19, wherein the another message comprises a path switch request message.

22. The apparatus of claim 16, wherein the first and second messages sent to the first and second access points respectively, comprise UE Context Modification Requests that include the circuit switched fallback indicator.

23. The apparatus of claim 16, wherein sending the second message to the second access point comprises sending the second message to the second access point if the handover of the access terminal is completed.

24. The apparatus of claim 16, wherein determining that the handover has been initiated comprises determining that the handover is complete based on reception of a handover notify message.

25. The apparatus of claim 16, wherein determining that the handover has been initiated comprises determining that the handover is complete based on reception of a path switch request message.

26. The apparatus of claim 16, wherein the circuit switched fallback controller is further configured to send, as a result of the determination, an indication of circuit switched fallback for the access terminal from a first mobility management entity associated with the first access point to a second mobility management entity associated with the second access point.

27. The apparatus of claim 26, wherein the indication is included in context information sent from the first mobility management entity to the second mobility management entity.

28. The apparatus of claim 16, wherein:
determining comprises receiving a rejection to the first message sent to the first access point; and
the rejection comprises an indication that the handover is in progress.

29. The apparatus of claim 16, wherein:
sending the first message to the first access point comprises an S1 interface procedure; and
determining comprises receiving a rejection to the S1 interface procedure; and
the rejection comprises an indication that the handover is in progress.

30. The apparatus of claim 29, wherein sending the second message to the second access point comprises reattempting the S1 interface procedure with the second access point if the handover is completed.

31. An apparatus for communication, comprising:
means for sending a first message to a first access point, wherein the first message includes a circuit switched fallback indicator associated with a circuit switched fallback procedure for an access terminal;
means for determining, after the first message is sent to the first access point, that handover of the access terminal from the first access point to a second access point has been initiated during the circuit switched fallback procedure at the first access point; and means for sending a second message to the second access point as a result of the determination, wherein the second message sent to the second access point includes the circuit switched fallback indicator associated with the circuit switched fallback procedure for the access terminal.

32. The apparatus of claim 31, wherein the first message sent to the first access point comprises a UE Context Modification Request.

33. The apparatus of claim 31, wherein the first message sent to the first access point comprises an Initial Context Setup Request.

34. The apparatus of claim 31, wherein determining comprises receiving another message that is indicative of the handover of the access terminal.

35. The apparatus of claim 34, wherein the another message comprises a handover notify message.

36. The apparatus of claim 34, wherein the another message comprises a path switch request message.

37. The apparatus of claim 31, wherein the first and second messages sent to the first and second access points respectively, comprise UE Context Modification Requests that include the circuit switched fallback indicator.

38. The apparatus of claim 31, wherein sending the second message to the second access point comprises sending the second message to the second access point if the handover of the access terminal is completed.

39. The apparatus of claim 31, wherein determining that the handover has been initiated comprises determining that the handover is complete based on reception of a handover notify message.

40. The apparatus of claim 31, wherein determining that the handover has been initiated comprises determining that the handover is complete based on reception of a path switch request message.

41. The apparatus of claim 31, further comprising means for sending, as a result of the determination, an indication of circuit switched fallback for the access terminal from a first mobility management entity associated with the first access point to a second mobility management entity associated with the second access point.

42. The apparatus of claim 41, wherein the indication is included in context information sent from the first mobility management entity to the second mobility management entity.

43. The apparatus of claim 31, wherein:
determining comprises receiving a rejection to the first message sent to the first access point; and
the rejection comprises an indication that the handover is in progress.

44. The apparatus of claim 31, wherein:
sending the first message to the first access point comprises an S1 interface procedure; and
determining comprises receiving a rejection to the S1 interface procedure; and
the rejection comprises an indication that the handover is in progress.

45. The apparatus of claim 44, wherein sending the second message to the second access point comprises reattempting the S1 interface procedure with the second access point if the handover is completed.

46. A computer-program product, comprising:
a non-transitory computer-readable medium comprising code for causing a computer to:

send a first message to a first access point, wherein the first message includes a circuit switched fallback indicator associated with a circuit switched fallback procedure for an access terminal;

determine, after the first message is sent to the first access point, that handover of the access terminal from the first access point to a second access point has been initiated during the circuit switched fallback procedure at the first access point; and send a second message to the second access point as a result of the determination, wherein the second message sent to the second access point includes the circuit switched fallback indicator associated with the circuit switched fallback procedure for the access terminal.

47. The computer-program product of claim 46, wherein the first message sent to the first access point comprises a UE Context Modification Request.

48. The computer-program product of claim 46, wherein the first message sent to the first access point comprises an Initial Context Setup Request.

49. The computer-program product of claim 46, wherein determining comprises receiving another message that is indicative of the handover of the access terminal.

50. The computer-program product of claim 49, wherein the another message comprises a handover notify message.

51. The computer-program product of claim 49, wherein the another message comprises a path switch request message.

52. The computer-program product of claim 46, wherein the first and second messages sent to the first and second access points respectively, comprise UE Context Modification Requests that include the circuit switched fallback indicator.

53. The computer-program product of claim 46, wherein sending the second message to the second access point comprises sending the second message to the second access point if the handover of the access terminal is completed.

54. The computer-program product of claim 46, wherein determining that the handover has been initiated comprises determining that the handover is complete based on reception of a handover notify message.

55. The computer-program product of claim 46, wherein determining that the handover has been initiated comprises determining that the handover is complete based on reception of a path switch request message.

56. The computer-program product of claim 46, wherein the computer-readable medium further comprises code for causing the computer to send, as a result of the determination, an indication of circuit switched fallback for the access terminal from a first mobility management entity associated with the first access point to a second mobility management entity associated with the second access point.

57. The computer-program product of claim 56, wherein the indication is included in context information sent from the first mobility management entity to the second mobility management entity.

58. The computer-program product of claim 46, wherein:
determining comprises receiving a rejection to the first message sent to the first access point; and
the rejection comprises an indication that the handover is in progress.

59. The computer-program product of claim 46, wherein:
sending the first message to the first access point comprises an S1 interface procedure; and
determining comprises receiving a rejection to the S1 interface procedure; and the rejection comprises an indication that the handover is in progress.

60. The computer-program product of claim 59, wherein sending the second message to the second access point comprises reattempting the S1 interface procedure with the second access point if the handover is completed.

* * * * *